Mar. 20, 1923.

L. MARCHAND 1,449,122

KALEIDOSCOPIC PROJECTING APPARATUS

Filed Nov. 11, 1922    3 sheets-sheet 3

Inventor
L. Marchand.
By Marker Clerk
Atty's

Patented Mar. 20, 1923.

1,449,122

UNITED STATES PATENT OFFICE.

LUDWIG MARCHAND, OF MUNICH, GERMANY, ASSIGNOR TO THE GUARANTY TRUST COMPANY, OF NEW YORK, OF LONDON, ENGLAND.

KALEIDOSCOPIC PROJECTING APPARATUS.

Application filed November 11, 1922. Serial No. 600,268.

*To all whom it may concern:*

Be it known that I, LUDWIG MARCHAND, a citizen of Germany, and residing at Thalkirchnerstrasse 11, Munich, Germany, have invented certain new and useful Improvements in and Relating to Kaleidoscopic Projecting Apparatus, of which the following is a specification.

This invention relates to apparatus for the projection of kaleidoscopic pictures and has for its object to provide constructions of such apparatus which enable a practically unlimited variety of pictures to be produced and to enable the manipulator to create his own designs so that these may give expression to his individual artistic sense.

This invention mainly consists in kaleidoscopic projecting apparatus including in combination a source of light, a positive lens or group of lenses, a plurality of kaleidoscopic reflecting systems each comprising a plurality of reflecting surfaces, a movable carrier for said systems serving to support at will of the manipulator any of said systems with its axis coincident with the axis of the positive lens or group of lenses, means permitting rotation of said systems independently of said carrier, and means enabling the interposing between the source of light and movable carrier of a transparent surface bearing predetermined designs.

The invention also consists in a kaleidoscopic projecting apparatus substantially as herein described and illustrated.

One way, by way of example, of carrying the invention into effect is illustrated and described with reference to the accompanying diagrammatic drawings, of which:—

Figure 1:
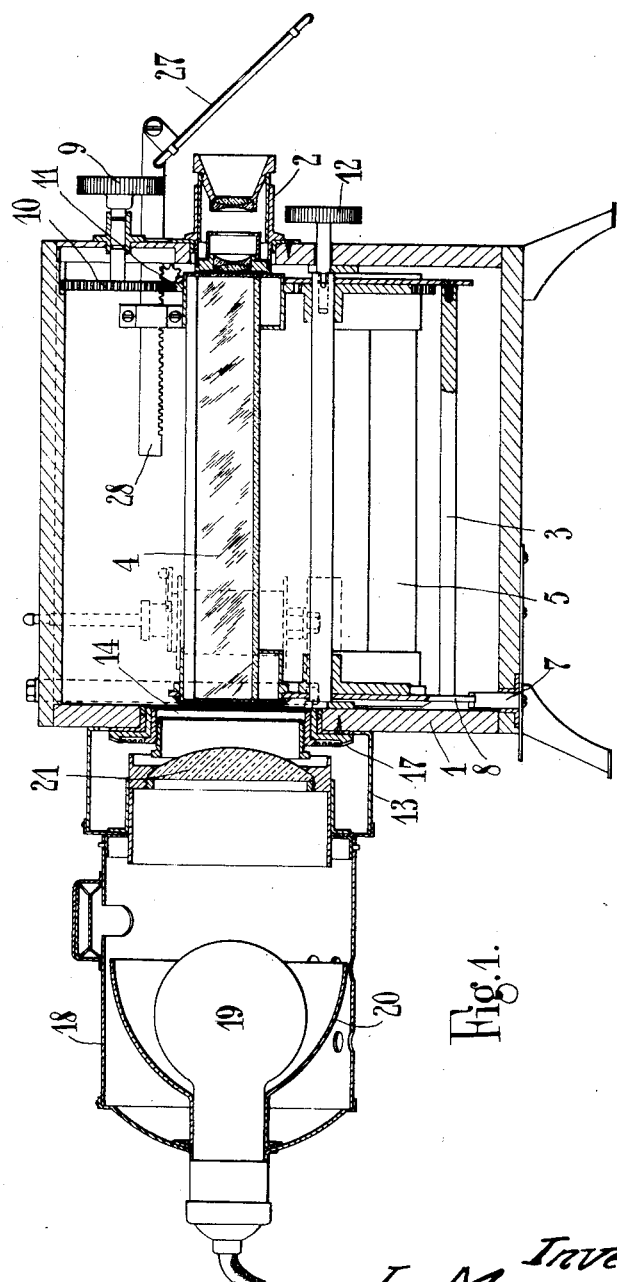
Figure 1 is a sectional elevation of a projection apparatus.

In the drawings, a rectangular box-like casing 1, supported on feet, carries at one end a focussing objective 2. Below this is mounted, in bearings at each end of the casing 1, a framework or carrier 3 carrying three symmetrically spaced kaleidoscopic mirror tubes 4, 5 and 6, composed of three, four and five mirrors respectively. These tubes are individually capable of rotation about their longitudinal axes in bearings in the carrier 3 and a locking device 7 engages the end 8 of the carrier 3, locking it in position when the longitudinal axis of any one of the mirror tubes 4, 5 and 6 is brought into alignment with the axis of the objective 2 by means of the knurled knob 12.

When a mirror tube is thus locked in alignment it may be rotated in its bearings in the carrier 3 by means of the knurled knob 9 and a pair of toothed wheels 10 and 11.

In the end of the casing 1, remote from the objective 2, and symmetrically disposed about the optical axis of the eye-piece and the coincident axis of one of the mirror tubes, is a circular aperture shrouded by a box-like extension 13. An object-box 14 with the usual clear and ground glass faces is mounted in this circular aperture and is capable of rotation at will by means of the knurled knob 15 and the bevel wheels 16 and 17.

A light projecting system comprising a fitting 18 removably attached to the extension 13 and provided with a lamp 19 and a reflector 20, and a lens 21 is so arranged that the axis of the beam of light projected from the lamp is coincident with the optical axis of the mirror tube and the objective.

A vertical slot 22 is provided at the end of the casing 1 in a plane which falls between the end of the operative mirror tube 4 and the face of the object-box 14.

Figure 2:
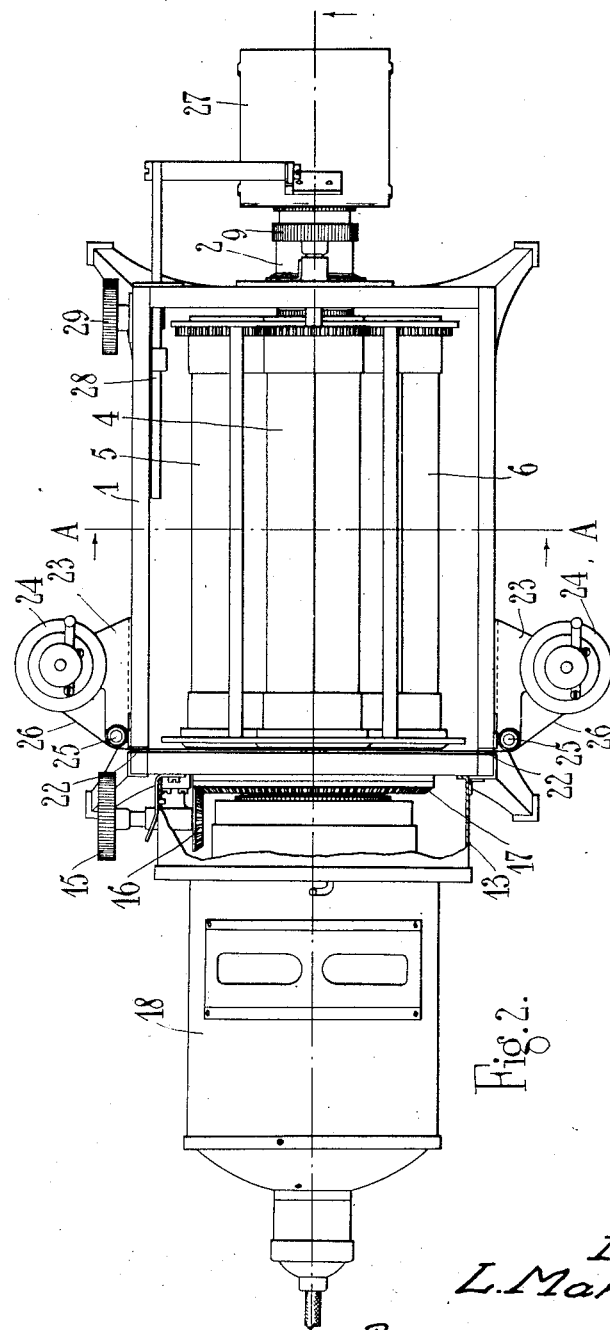
Figure 2 is a plan of same in part section and with the top removed to show the interior.
Figure 3:
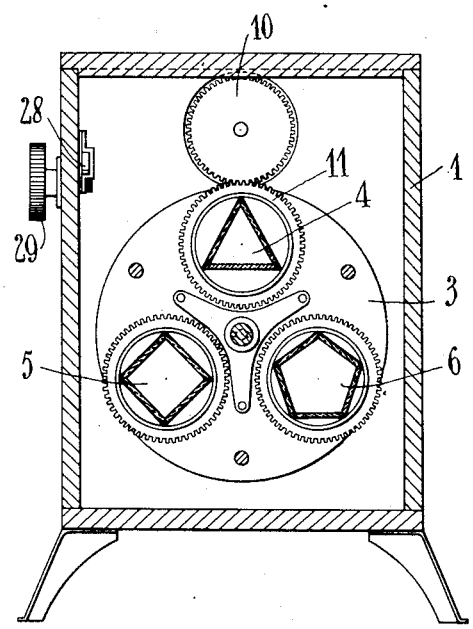
Figure 3 is a transverse sectional elevation of Figures 1 and 2 on the line A—A.

Brackets 23 carrying spools 24 and rollers 25 are provided, as shown in plan in Figure 2, on the sides of the casing 1 to allow of the passage at will of a film or the like 26 across the axis of the optical system of the kaleidoscope.

A reflector 27, suitably hinged as shown on an extension of a rack-like member 28 may be adjusted along the optical axis of the system by means of the knurled knob 29.

The mode of operation of the device is as follows:—A strip of film suitably prepared in design and colour is mounted on the spools 24 in the usual manner and the object-box is charged with suitable material or left empty as desired. The carrier 3 is then rotated by the knurled knob 12 until the desired mirror system, say 4, is aligned with the positive lens system 2 and the beam from the light projecting system 19, 20, 21.

The lens system 2 is then focussed and the reflector 27 adjusted to deflect the kaleidoscopic image on to a horizontal plane for convenience of registration. Racking the reflector 27 in and out by means of the knurled knob 29 diminishes or enlarges the projected image with corresponding increase or decrease of the intensity of illumination.

Rotation of the knurled knob 15 serves to operate the material in the object-box in the usual manner. Suitable rotation of the spools 24 alters the kaleidoscopic image in accordance with the markings brought into the operative position.

Substitution of the mirror tubes 5 and 6 for 4 by turning the knob 12 and the carrier 3 varies the image independently of variation of the film and object-box, while individual rotation of the operative mirror tube itself by means of the knurled knob 9 varies the image in a further independent series for each mirror tube without alteration of the film or object-box.

The object-box may be removed bodily from the apparatus and a number of films may be superposed; for instance, a film carrying colour elements may be associated with one carrying contour elements, or a single film may be marked in line and colour.

More than one pair of film carriers may be provided to enable independent variation of films used in conjunction.

By the above means, to any line or contour picture there may be added a colour image or a further contour image, and the scope of the apparatus is obviously enormously increased.

When films alone are varied it is possible to repeat images at any time by reinstating the films in the desired position.

Slight modifications of an image may also be readily produced by slight movement of one or more of the films, the degree of variation depending on the extent of the movement. In the preparation of the films or the like the basic designs may be drawn to express a known or an individually created design. The projected image necessarily partakes of the nature of the basic design and from the practically unlimited number of variations which are rendered possible by the previously described means, any may be selected in accordance with the artistic sense of the selector.

If desired, the image may be projected upon a photographically sensitive surface in order to record any particular design.

Having now described my invention what I claim as new and desire to secure by Letters Patent is:—

1. Kaleidoscopic projecting apparatus including in combination a source of light, a positive lens or group of lenses, a plurality of kaleidoscopic reflecting systems each comprising a plurality of reflecting surfaces, a movable carrier for said systems serving to support at will of the manipulator any of said systems with its axis coincident with the axis of the positive lens or group of lenses, means permitting rotation of said systems independently of said carrier, and means enabling the interposing between the source of light and movable carrier of a transparent surface bearing predetermined designs.

2. Kaleidoscopic projecting apparatus including in combination a source of light, a positive lens system, a plurality of kaleidoscopic reflecting systems each comprising a plurality of reflecting surfaces, a carrier for said reflector systems serving at will of the operator to support any of said reflector systems with its axis coincident with the axis of the positive lens system, means for rotating said carrier, means for registering it in alternative positions, means for rotating about its own axis the reflector system which rests in register with the optical axis of the positive lens system, an object receptacle, means for rotating said object receptacle, a transparent surface bearing predetermined basic design elements and interposed between the source of light and the said carrier.

3. Kaleidoscopic projecting apparatus including in combination a source of light, a positive lens system, a plurality of kaleidoscopic reflecting systems each comprising a plurality of reflecting surfaces, a carrier for said reflector systems serving at will of the operator to support any of said reflector systems with its axis coincident with the axis of the positive lens system, means for rotating said carrier, means for registering it in alternative positions, means for rotating about its own axis the reflector system which rests in register with the optical axis of the positive lens system, an object receptacle, means for rotating said object receptacle, a transparent strip bearing predetermined basic design elements interposed between said source of light and said carrier, supporting spools for said strip, a reflecting surface adapted to intercept the light emerging through said positive lens system and means for adjusting the position of said surface relatively to said lens system.

4. In a kaleidoscopic projecting apparatus, the combination of a kaleidoscopic tube, a light-transmitting strip bearing predetermined design elements, means for projecting light rays through said strip and kaleidoscopic tube, means to permit said strip to move across the axis of said tube and the projected light, and the movement of the strip arrested at any desired point for a projection of the design element at that portion, and means for projecting the kaleidoscopically formed image onto a suitable receiving surface.

5. In a kaleidoscopic projecting apparatus, the combination of a rotatable kaleidoscopic tube, a light-transmitting strip bearing predetermined design elements, means for projecting light rays through said strip and kaleidoscopic tube, means for moving said strip across the axis of said tube and the projected light, and means for projecting the image of said design elements on a suitable receiving surface.

6. In a kaleidoscopic projecting apparatus, the combination of a kaleidoscopic tube, means for moving a transparent strip bearing predetermined design elements across the axis of said tube, an object box having design elements in optical alignment with said tube, and means for projecting light through said object box and the portion of the film aligned with said tube and through the tube to effect the ultimate composite design.

7. In a kaleidoscopic projecting apparatus, the combination of a kaleidoscopic tube, means whereby a light-transmitting strip bearing predetermined design elements may be moved across the axis of said tube and stopped at will for the projection of the predetermined design element at said portion of the strip, an object box in optical alignment with said tube, means for moving the box to vary the position of design elements placed therein, means for projecting light through said object box and the aligned portion of the strip and through said tube, means for rotating the said tube at will to vary the ultimate composite image, and means for projecting the composite image onto a surface where it may be inspected and then photographed.

8. In kaleidoscopic projecting apparatus, the combination of a plurality of kaleidoscopic tubes having different arrangements of angularly disposed mirrors therein, a source of light and a lens system, means for positioning and securing, at will, any of said tubes in optical alignment with said lens system and the beam of light projected from said source, and means for guiding a transparent film carrying predetermined design elements across the axis of the aligned tube and the projected beam of light.

In testimony whereof I have signed my name to this specification.

LUDWIG MARCHAND.

Witness:
ANTON PERMERSKY.